Dec. 2, 1969 E. A. JOHNSON 3,482,241

TOUCH DISPLAYS

Filed Aug. 2, 1966 3 Sheets-Sheet 1

Inventor
ERIC ARTHUR JOHNSON
By
Cushman, Darby & Cushman
Attorneys

Inventor
ERIC ARTHUR JOHNSON
By Cushman, Darby & Cushman
Attorneys

Dec. 2, 1969 E. A. JOHNSON 3,482,241

TOUCH DISPLAYS

Filed Aug. 2, 1966 3 Sheets-Sheet 3

Inventor
ERIC ARTHUR JOHNSON
By Cushman, Darby & Cushman
Attorneys

United States Patent Office 3,482,241
Patented Dec. 2, 1969

3,482,241
TOUCH DISPLAYS
Eric Arthur Johnson, Malvern, England, assignor to Minister of Aviation in Her Britannic Majesty's Government of the United Kingdom of Great Britain and Northern Ireland, London, England
Filed Aug. 2, 1966, Ser. No. 569,731
Claims priority, application Great Britain, Aug. 5, 1965, 33,524/65; June 28, 1966, 28,883/66
Int. Cl. G09b *13/00;* H05b *41/00;* G06k *1/00*
U.S. Cl. 340—337 7 Claims

ABSTRACT OF THE DISCLOSURE

A plurality of touch-sensitive contacts, placed adjacent the screen of a cathode ray tube, which may be selectively actuated for indicating which portion of the image on the cathode ray screen is to be exmained in further detail. The position of the actuated contact with respect to the viewing screen indicates which portion of the image has been selected to an output means such as a data processing system. Either resistance change or capacitance change across the actuated contact may be sensed.

The presnet invention relates to touch displays.

A very large number of so-called automatic data processing systems require the co-operation of human operators to achieve satisfactory operation. In many of these systems it is necessary to reduce operator reaction time to a minimum, which in turn demands an arrangement where communciations between the operator and the system and vice versa is the best possible. This requires that the methods of presenting information to and receiving instructions from the operator should be rapid and easy.

For the presentation of information to the operator, a method often used at the present time is some form of printing, usually electromechanical. Although the normal teleprinter output is rather slow in relation to the speed with which an operator can absorb information, an extension of the technique to line printing cn overcome this. Alternatively an electronic data display is sometimes used, and in the case of line printing or electronic data display time required to produce a readable output from the system does not really add significantly to the time required for an operator to accept information. There is also a considerable amount of flexibility of format available to ease understanding.

The situation is not so satisfactory in the case of accepting instructions from an operator. A current method is to make use of some form of keyboard with either a standard set of alpha-numeric keys or some special keys, usually called function keys, or both. The function keys as their name implies, usually provide control instructions to the system whilst the alpha-numeric keybord is used for information input, interpreted by the system in acocrdance with the most recent control instructions. The process can be rather slow and clumsy especially when a fairly large system is involved with several operators having a wide range of input possibilities in the interests of flexibility.

It is an object of the invention to provide means for feeding data (instructions or information) to a system by using a touch display by means of which means responsive to touch are associated with a display. The means responsive to touch may be connected to a data input of the system.

According to the present invention there is provided, for use with means for displaying data, means responsive to touch having an output indicative of the area touched.

The means responsive to touch may include a transparent screen responsive to touch suitable for fixing in front of the means for displaying data.

Preferably the means responsive to touch is connected to a data input of a data processing system. In such a case it is highly advantageous for the means for displaying data to be connected to a data output of the data processing system in such a manner that the data displayed may be altered under the control of the data processing system.

A convenient means for displaying data is, of course, provided by the cathode ray tube, which may be controlled to write output information on its screen; the invention provides a method of feeding more information to the data processing system, so continuing the programme. For example, the cathode ray tube may display a list of items and it may be desired to examine one of the items in further detail. It is frequently troublesome to indicate to the data processing system which item is the one to be examined. Under these circumstances it should be possible to provide sites on the cathode ray tube which are responsive to touching by the hand of the operator. The effect would be that the operator touches the place on the cathode ray tube screen where the item is displayed and this signals back to the data processing system that that particular item is selected (for further examination, say).

Such a system may be arranged by embedding electric wires in the screen, one to each site on the cathode ray tube, and using the operator's natural capacitance to earth, which is of the order of 100 pf.

In an alternative arrangement a pair of wires may be arranged close to one another and the operator's finger, touching the two wires, would short them out via the natural skin resistance of the finger plus the contact resistance, which is of the order of 500,000 ohms.

Embodiments of the invention will be described by way of example with reference to the accompanying drawings, in which.

Figure 1:
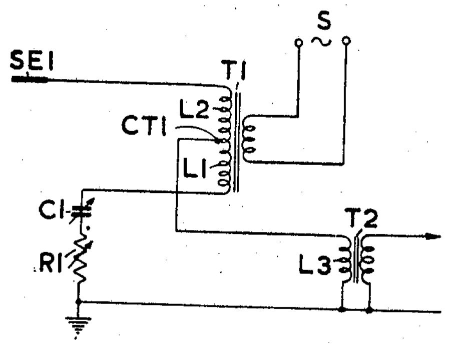
FIGURE 1 is a circuit diagram of a touch sensitive system.

In FIGURE 1 the primary winding of a transformer T1 is fed from a high frequency source S (say 3000 cycles per second) and the secondary winding is centre-tapped. One half L1 of the secondary winding is connected bteween the centre tap CT1 and a terminal connected to earth via a variable capacitor C1 and a variable resistor R1 in series and the other half L2 of the secondary winding is connected between the centre tap CT1 and a sensitive electrode SE1. The centre tap CT1 is connected to earth via the primary winding L3 of a transformer T2.

The action of the circuit is as follows. The windings L1 and L2, together with the capacitor C1 and the resistor R1, and the self capacity of the sensitive electrode SE1 form a bridge circuit which is adjusted to be balanced at the frequency $f_0$ of the source S. When the sensitive electrode SE1 is touched by an operator the capacitance to earth presented to it is sufficient to throw the bridge off balance and an alternating potential appears across the winding L3 and hence a signal appears in the secondary winding of the transformer T2.

Figure 2:
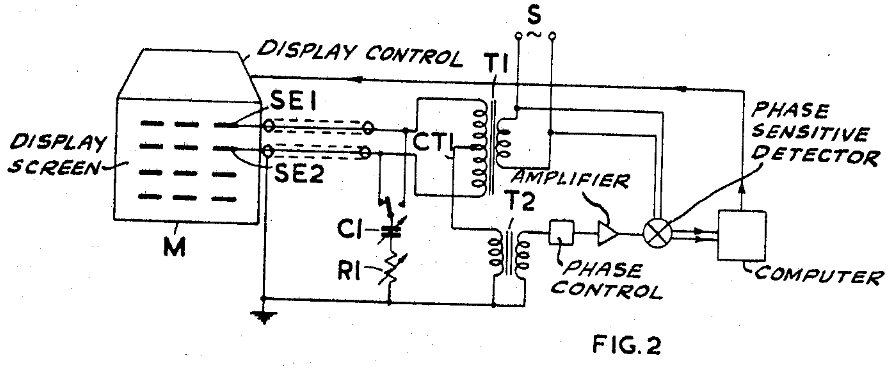
FIGURE 2 is a more complete circuit diagram of part of a display incorporating a touch-sensitive system.

In FIGURE 2 an electronic data display includes a matrix M of sensitive electrodes SE1, SE2, . . . , two of which are connected (via screened cable) to the end terminals of the transformer T1. One of the end terminals (depending on the stray capacities) of the secondary winding of the transformer T1 is connected to earth via the capacitor C1 and the resistor R1 in series. The centre tap CT1 of the secondary winding of the transformer T1 is connected to earth via the primary winding of the pulse transformer T2, as before. The secondary winding of the transformer T2 is connected to a phase control unit P the output of which is connected to a phase sensitive detector PSD via an amplifier/limiter. The output of the phase sensitive detector PSD is applied to a computer K which has an output applied to the display control DC.

The action of this circuit differs from that of the circuit described with reference to FIGURE 1 in the fact that the bridge circuit R1–C1–T1 secondary–T2 primary may be unbalanced by touching either of the sensitive electrodes SE1 or SE2. In each case the result will be an output from the transformer T2 but the phase relationship of this output with the supply current S will be different for the two different electrodes SE1 and SE2. The function of the phase control P is to ensure that the signal is in the correct phase to ensure a suitable output from the phase sensitive detector after allowing for stray phase shift throughout the system. The output of the transformer T2 is applied from the phase control P to the amplifier A and thence to the phase sensitive detector PSD where its phase is compared with that of the supply current S. The phase sensitive detector PSD has two outputs and these will therefore correspond separately to the two separate sensitive electrodes SE1 and SE2.

Thus an output, indicating which sensitive electrode is touched, is applied to the computer K, where it is used typically to set up a fresh display via the display control DC.

The remaining electrodes (SE3, etc.) are also connected in pairs to circuits similar to FIGURE 2 while for the sake of economy the amplifier A and phase sensitive detector may be time shared between the circuits.

Figure 3:
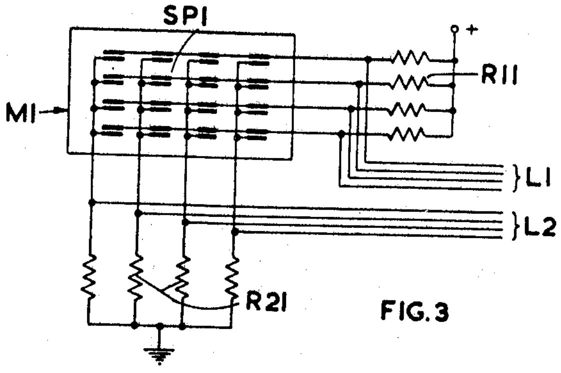
FIGURE 3 is a circuit diagram of part of an alternative display incorporating a touch sensitive system.

FIGURE 3 is a circuit diagram of part of an alternative display incorporating a touch-sensitive system. In this display a matrix M1 of pairs of sensitive electrodes such as SP1 is arranged on the display. All the upper electrodes of each row are connected together to a positive voltage source via a common resistor such as R11 and all the lower electrodes of each column are connected together to earth via a common resistor such as R21. The terminals remote from the positive voltage source of the resistors (such as R11) associated with the upper electrodes are connected to separate leads in a bundle L1 and the terminals remote from earth of the resistors (such as R21) associated with the lower electrodes are connected to separate leads in a bundle L2.

When a pair of electrodes (such as the pair SP1) is touched by an operator a current will flow and this may be detected both by a voltage drop at the terminal remote from the positive voltage source of the corresponding resistor (such as R11) connected to the positive voltage source and a voltage rise at the terminal remote from earth of the corresponding resistor (such as R21) connected to earth. This rise and fall in voltage may be amplified, inverted and/or otherwise manipulated in a known manner and a series of known gates connected between pairs of wires of which one is from the bundle L1 and one from the bundle L2. By this way which pair of wires has been touched may be determined exactly.

Alternatively the rows of upper electrodes and the columns of lower electrodes may be connected to independent systems each system being a set of circuits similar to FIGURE 2. An output simultaneously from row and column system then indicates which pair of electrodes has been touched.

Figure 4:
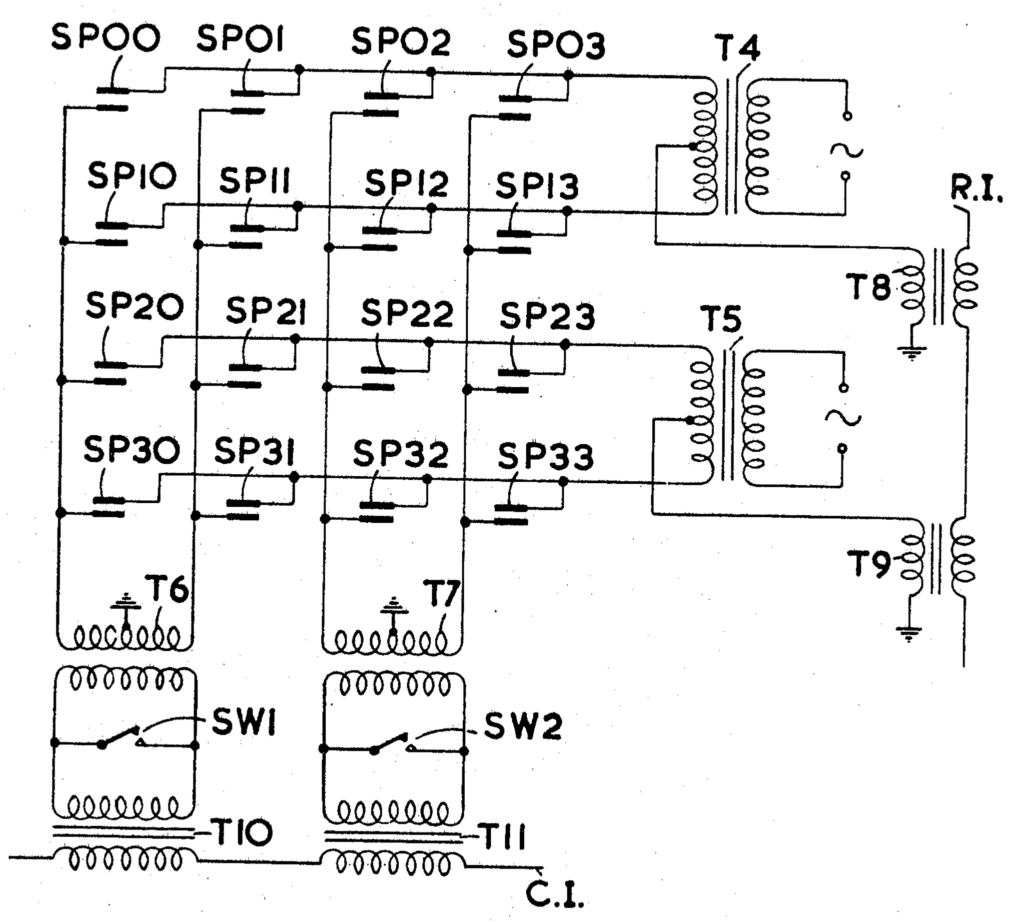
FIGURE 4 is a circuit diagram of part of a further alternative display incorporating a touch sensitive system.

FIGURE 4 is a circuit diagram of part of a further alternative display incorporating a touch sensitive system. This is an alternative way of using the skin resistance of the operator's finger to unbalance bridge circuits.

A matrix of pairs of sensitive electrodes SP00, SP01, SP02, SP03, SP10, SP11, SP12, SP13, SP20, SP21, SP22, SP23, SP30, SP31, SP32 and P33 is connected in rows to the secondary windings of two transformers T4 and T5 in the following manner. One terminal of the secondary winding of the transformer T4 is connected to the upper electrode of each of the pairs P00, SP01, SP02 and SP03 of sensitive electrodes in the first row, the other terminal of the secondary winding of the transformer T4 is connected to the upper electrode of each of the pairs SP10, SP11, SP12 and SP13 of sensitive electrodes in the second row, one terminal of the secondary winding of the transformer T5 is connected to the upper electrode of each of the pairs SP20, SP21, SP22 and SP23 of sensitive electrodes in the third row, and the other terminal of the secondary winding of the transformer T5 is connected to the upper electrode of each of the pairs SP30, SP31, SP32 and SP33 of sensitive electrodes in the fourth row.

Similarly the matrix is connected in columns to the primary windings of two transformers T6 and T7 in the following manner. The lower electrode of each of the pairs SP00, SP10, SP20 and SP30 of sensitive electrodes in the first column is connected to one terminal of the primary winding of the transformer T6, the lower electrode of each of the pairs SP01, SP11, SP21 and SP31 of sensitive electrodes in the second column is connected to the other terminal of the primary winding of the transformer T6, the lower electrode of each of the pairs SP02, SP12, SP22 and SP32 of sensitive electrodes in the third column is connected to one terminal of the primary winding of the transformer T7 and the lower electrode of each of the pairs SP03, SP13, SP23 and SP33 of sensitive electrodes in the fourth column is connected to the other terminal of the primary winding of the transformer T7.

The primary windings of the transformers T4 and T5 are each excited by a high frequency source (say 3000 cycles per second). The primary winding of a transformer T8 is connected between a centre tap on the secondary winding of the transformer T4 and earth and the primary winding of a transformer T9 is connected between a centre tap on the secondary winding of the transformer T5 and earth. The secondary windings of the transformers T8 and T9 are connected in series in a row interrogate wire RI.

The primary windings of the transformers T6 and T7 are each earth centre tapped. The secondary winding of the transformer T6 is connected across the primary winding of a transformer T10 and a switch SW1 is connected across them both. The secondary winding of the transformer T7 is connected across the primary winding of a transformer T11 and a switch SW2 is connected across them both. The secondary windings of the transformers T10 and T11 are connected in series in a column interrogate wire CI.

The acion of the circuit is an extension of that described above with reference to FIGURE 2; the touching of a pair of electrodes such as the pair SP12 will unbalance two bridge circuits, namely in this case the bridge circuit which includes the secondary winding of the transformer T4 and the bridge circuit which includes the primary winding of the transformer T7, the bridge circuits associated with the columns (i.e. the bridge circuits which include the primary windings of the transformers T6 and T7 respectively) being energised from the transformers T4 and T5 via the capacitances between the electrodes of the sensitive electrode paris SP00 etc. The particular "row" and "column" bridges unbalanced and the direction of unbalance define exactly which pair of electrodes is touched. The result will be an A.C. signal having a given phase in the primary winding of one of the transformers T8 or T9 and an A.C. signal having a given phase in the primary winding of one of the transformers T10 or T11. In a time-shared system which bridge is unbalanced may be determined by shorting out the primary windings of the transformers T8 and T9 in turn and observing when the signal in the row interrogate wire RI disappears and similarly shorting out the primary windings of the transformers T10 and T11 in turn and observing when the signal in the column interrogate wire CI disappears.

This system may obviously be extended to a larger matrix of pairs of sensitive electrodes.

Figure 5:
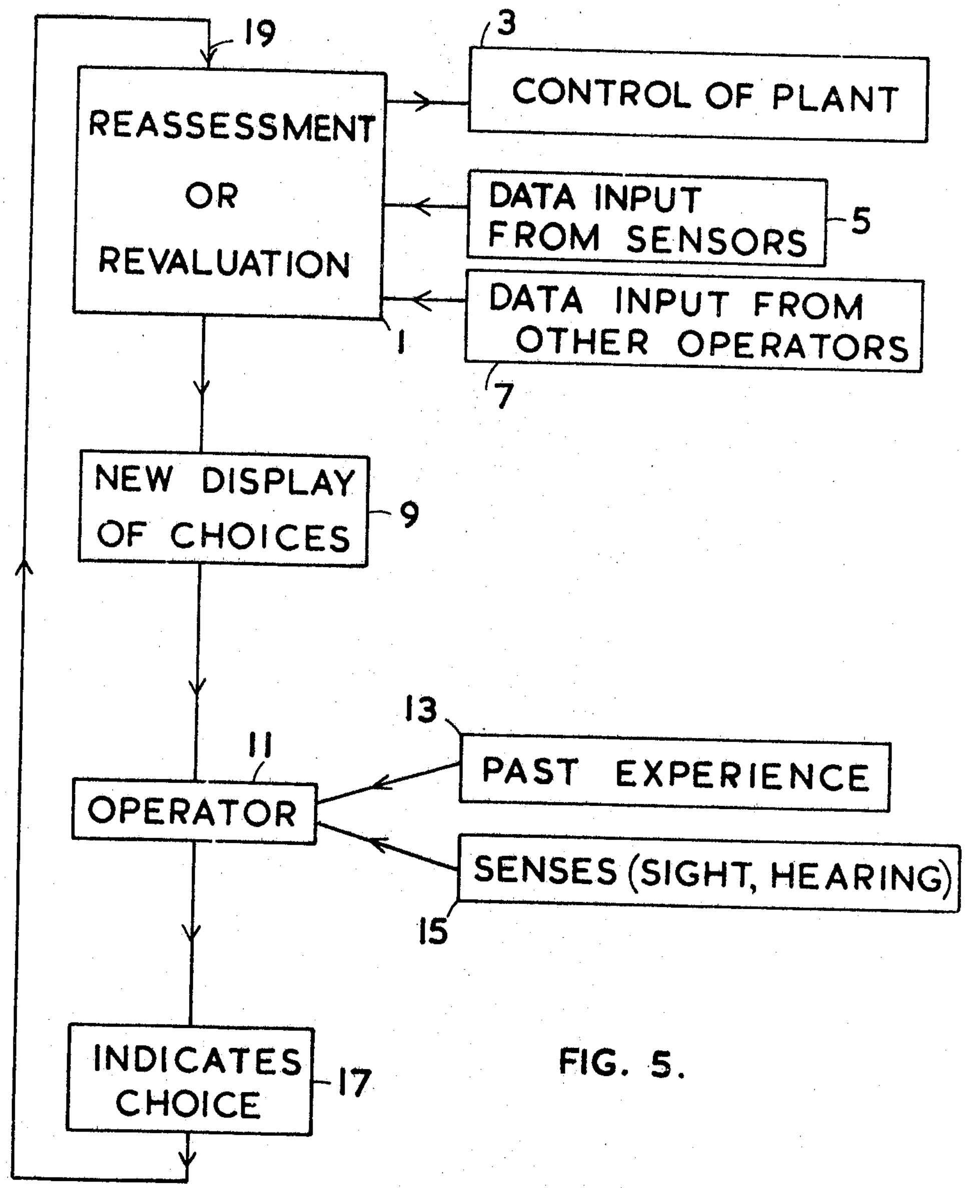
FIGURE 5 is a diagrammatic representation of the logic steps taken in a process using a data processing system and input and output facilities.

FIGURE 5 is a diagrammatic representation of the logic steps taken in a process using a data processing system and input and output facilities.

In such a process the system may be constantly reassessing or revaluing a situation (step 1) in the light of various data inputs. The result of its reassessment or revaluation may be applied to the control of plant 3 (such as industrial plant) or air traffic or some other situation. One data input to the system may be from sensors or other automatic devices some of which may be controlled by the plant 5. Another may be from other human operators 7. Sooner or later the data process will reach a stage in which the system is programmed to ask for human intervention and a display of choices is made 9. The human operator makes the choice 11 in the light of past experience 13 his senses (such as what he sees or hears) 15 and so on. The choice is indicated to the system 17 and becomes a further data input 19 and the process continues.

It is obvious that the speed of such a process will depend upon the speed of the slowest step, that is, the step 17 (in a conventional system) and the invention is an attempt to overcome this speed limitation.

The first idea underlying the design and operation of a touch display is that, no matter what the overall and complete range of possible signals from an operator might be, at any one time the signal actually sent by the operator to the data processing system will be one chosen from a strictly limited range. For example, the signal might be one of the ten numerical digits. Possibly one of the widest range of choice actually exercised would be to select one from the twenty six available alphabetic characters. Secondly, in order that the system should be able to interpret the signal correctly, it must know from what range of possibilities it has been chosen and also what consequences must stem from that choice. This information within the system can therefore be used to restrict the range of choice available to the operator at any given time to just those possibilities which are relevant to his present task. Subsequent to any input signal being received the system can alter the range of choice as and when required. This control is, of course, exercised by the computer programme in the system and in consequence, the operation of the touch display system can be described as programmed control.

One consequence of this control is that the scope for operator errors, especially errors of omission, is significantly reduced.

Since the matter actually displayed on the electronic data display may be varied by the system, the meaning of the touch wires (or the units of whatever touch system is in use) is variable. In other words, the display resembles an alpha-numeric keyboard in which the labels attached to the keys are not fixed but can be changed by the system computers in accordance with the required meaning at any time. The effect of this idea is far reaching. Not only does it allow the number of "keys" to be very limited whilst retaining a large measure of flexibility in their interpretation but also it allows the "meaning" of a key to be changed as a result of information previously fed to the system. A particular example is given below where one meaning attached to the keys is that of the "call signs" of the aircraft under control of a given operator. These of course change quite often and normally consist of up to seven alpha-numeric symbols. By labelling "keys" in this way, communication with the system for a particular aircraft can be established in a single operation.

The first requirement of a data input device based on the ideas outlined above is a flexible display system, capable of presenting the possible choices to an operator. Such a possibility is clearly available in an electronic data display for many applications. An extension to provide some form of graphical display may be desirable in certain cases. The second requirement is to provide sensitive areas of the display screen which are capable of producing a signal when touched by a bare finger. Such an arrangement is described above.

An example will be given of the use of the touch display device in the amendment of flight plans in an Air Traffic Control system. In order to simplify the description it will be assumed that the amendments arise as a result of radio telephone reports from the aircraft.

The sequence of events is as follows.

Firstly, in the rest condition, i.e., between amendments the next action of the controller must logically be to refer to a particular aircraft, and the programme of the data processing system is written to take this into account. The system already has the call signs of all the aircraft in the sector, and it therefore displays these call signs one against each touch wire.

Secondly, when the aircraft calls and identifies itself by its call sign, the controller touches the wire against the call sign.

This may be contrasted with the conventional present-day action in which the five to seven characters involved are typed on a teleprinter, or the number of the line on which the call sign is shown is read off and injected into an electronic data display.

The computer has now been instructed as to which aircraft is involved and the computer programme is such that the controller must next specify which item of the flight plan is to be amended. The computer therefore displays on the top half of the touch-display the call sign selected followed by the items of the flight plan, each item consisting of its name and under the name the present value. Against the touch wires there are displayed the names of items, the pattern of the arrangement of the items being made the same as in the flight plan displayed above.

The controller selects an item by touching the wire and the computer responds by marking the selected item and offering to the controller, against the touch wires, the list of possibilities for the first character of the value. If it is a numerical value the digits 0 to 9 may be offered but if the first digit is limited, as for a time in minutes to 5 then only 0 to 5 need be offered; on the other hand if the value is a symbol, then the appropriate symbols can be offered.

The controller selects the character and the computer inserts this in the flight plan under the first character of the old value of the item and then, if the value consists of more than one character, the computer presents the possibilities for the next character and so on, until the new value of the item has been built up and displayed under the old value.

The computer than asks the controller by words against the touch wires is this new value to be "executed" or "ignored"; the controller inspects the old and new values to see if the new value appears correct and credible and if so, by touching "execute," instructs the computer to incorporate the new value.

The computer then puts the display back to the initial reset condition to await the arrival of a new amendment.

Various refinements can be added, for instance, "back-step" which cancels the previous input and restores the display to the previous condition; this gives a quick way of correcting input errors.

According to the amendment required, the sequence can vary. One in particular with deserves special mention is the sequence for cancelling a flight plan. It is of course, very important that this does not happen by error and so when the controller uses the touch wire labelled "ERASE," the computer is programmed to present the words "CONFIRM ERASURE OF KL104" for example. This illustrates the way in which the touch display can be used to alert the controller at critical phases in operation.

Of course other possible applications exist and if the display process has adequate flexibility to present solutions to a problem pictorially then by appropriate labelling of the touch wires corresponding to the solution the choice can be indicated by a single operation. Again, another interesting possibility is the case of rarely used procedures, for example. EMERGENCY. Here the instructions can be presented in plain language e.g., "alert fire brigade," "you must now choose to do . . . or to do . . ." and so on. The computer ensures that not only does the controller clearly understand what is to be done but ensures that no omissions occur.

I claim:

1. Apparatus for indicating to an output means which portion of a data-representing image on a viewing means has been selected for further processing comprising display means including means for generating visible images, input means connected to said means for generating visible images for altering said image on said display means and viewing means responsive to said generating means for displaying said visible images, a plurality of touch sensitive contact means sensitive to a change in impedance presented by touching by the human body, said contact means being placed adjacent said viewing means for indiacting which portion of the image on said viewing means has been selected, the position of said touch sensitive contact means selected with respect to said viewing means being related to the position of the selected portion of said image on said viewing means, and sensing means for determining and indicating to said output means which of said touch sensitive contacts has been activated.

2. The apparatus defined in claim 1 wherein said plurality of touch sensitive contact means are arranged in rows and columns and said sensing means is adapted to determine which of said touch sensitive contact means has been actuated by determining in which of said rows and said columns said actuated contact means is located.

3. The apparatus defined in claim 1 wherein said means for generating visible images is a cathode ray tube and said viewing means is a screen mounted on and responsive to said cathode ray tube.

4. The apparatus defined in claim 1 wherein manual actuation of said touch sensitive contact means causes a capacitance change across the actuated contact means and said sensing means comprises a means for detecting a capacitance change at each of said touch sensitive contacts.

5. The apparatus defined in claim 4 wherein said means for detecting a capacitance change comprises a normally balanced alternating current bridge circuit adapted to be unbalanced by a change in capacitance caused by actuation of one of said touch sensitive contacts.

6. The apparatus defined in claim 1 wherein each of said touch sensitive contact means incldue a first contact and a second contact and said sensing means comprises means for detecting a resistance change between said first and second contacts of the selected contact means.

7. The apparatus defined in claim 6 wherein said means for detecting a resistance change between said first and said second contacts of said selected contact means comprises normally balanced alternating current bridge means adapted to detect said resistance change.

References Cited

UNITED STATES PATENTS

| | | | |
|---|---|---|---|
| 1,283,147 | 10/1918 | Ghio. | |
| 3,194,975 | 7/1965 | Diamond. | |
| 3,207,905 | 9/1965 | Bray. | |
| 3,307,071 | 2/1967 | Diamond. | |
| 3,256,516 | 6/1966 | Melia et al. | 340—324.1 |
| 3,342,935 | 9/1967 | Leifer et al. | 340—324.1 |
| 3,399,401 | 8/1968 | Ellis et al. | 340—324.1 |

OTHER REFERENCES

Bezgin, Generation of X and Y Coordinate Information, IBM publication, vol. 1, No. 6, April 1959.

JOHN W. CALDWELL, Primary Examiner

MARSHALL M. CURTIS, Assistant Examiner

U.S. Cl. X.R.

235—61.6; 340—365